United States Patent
Trim et al.

(10) Patent No.: US 11,244,162 B2
(45) Date of Patent: Feb. 8, 2022

(54) AUTOMATIC IDENTIFICATION OF RELATIONSHIPS BETWEEN A CENTER OF ATTENTION AND OTHER INDIVIDUALS/OBJECTS PRESENT IN AN IMAGE OR VIDEO

(71) Applicant: INTERNATIONAL BUSINESS MACHINES CORPORATION, Armonk, NY (US)

(72) Inventors: Craig M. Trim, Ventura, CA (US); Sarbajit K. Rakshit, Kolkata (IN); Victor Povar, Vancouver (CA); Reinaldo T. Katahira, Sao Paulo (BR)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 468 days.

(21) Appl. No.: 16/176,270

(22) Filed: Oct. 31, 2018

(65) Prior Publication Data
US 2020/0134315 A1 Apr. 30, 2020

(51) Int. Cl.
*G06K 9/00* (2006.01)
*G06K 9/03* (2006.01)
*G06F 16/28* (2019.01)
*G06F 16/583* (2019.01)

(52) U.S. Cl.
CPC ....... *G06K 9/00671* (2013.01); *G06F 16/288* (2019.01); *G06F 16/5838* (2019.01); *G06K 9/00677* (2013.01); *G06K 9/033* (2013.01); *G06K 2209/27* (2013.01)

(58) Field of Classification Search
USPC ................. 382/100, 103, 104, 305
See application file for complete search history.

(56) References Cited

U.S. PATENT DOCUMENTS

| | | | |
|---|---|---|---|
| 6,675,386 B1 * | 1/2004 | Hendricks | H04N 7/17318 348/143 |
| 7,953,690 B2 * | 5/2011 | Luo | G06N 7/005 706/47 |
| 8,311,278 B2 * | 11/2012 | Moore | G06F 16/58 382/103 |

(Continued)

OTHER PUBLICATIONS

Xia et al., "Understanding Kin Relationships in a Photo", semanticscholar.org, IEEE Transactions on Multimedia, vol. 14, No. 4, Aug. 2012, 11 pages.

(Continued)

*Primary Examiner* — Ishrat I Sherali
(74) *Attorney, Agent, or Firm* — Anthony England; Andrew D. Wright; Roberts Calderon Safran & Cole, P.C.

(57) ABSTRACT

A computer-implemented method includes: accessing, by a computing device, content stored or captured by a user device; determining, by the computing device, context associated with the content; determining, by the computing device, a center of attention of the content based on the context; identifying, by the computing device, relationships between the center of attention and one or more other individuals or objects present in the content; and outputting, by the computing device, information identifying the relationships for displaying the information identifying the relationships on a content viewer application.

18 Claims, 7 Drawing Sheets

(56) References Cited

U.S. PATENT DOCUMENTS

| | | | | |
|---|---|---|---|---|
| 8,897,482 | B2* | 11/2014 | Mein | G06T 7/593 |
| | | | | 382/100 |
| 9,210,313 | B1* | 12/2015 | Svendsen | G06F 3/041 |
| 9,761,031 | B2* | 9/2017 | Kato | G06K 9/6202 |
| 9,928,445 | B2* | 3/2018 | Hardee | G06F 40/30 |
| 9,934,424 | B2* | 4/2018 | Bostick | G06K 9/00677 |
| 9,940,576 | B1* | 4/2018 | Dey | G06K 9/00288 |
| 10,217,000 | B2* | 2/2019 | Hardee | G06K 9/00677 |
| 10,218,898 | B2* | 2/2019 | Bostick | H04N 5/23222 |
| 10,303,999 | B2* | 5/2019 | Hertz | G06N 5/02 |
| 10,334,158 | B2* | 6/2019 | Gove | H04N 5/23238 |
| 10,691,876 | B2* | 6/2020 | Schiffer | G06K 9/00288 |
| 10,783,356 | B2* | 9/2020 | Bostick | G06T 11/20 |
| 10,880,465 | B1* | 12/2020 | Svendsen | G06K 9/00288 |
| 2006/0165386 | A1* | 7/2006 | Garoutte | G08B 13/19608 |
| | | | | 386/210 |
| 2009/0116752 | A1* | 5/2009 | Isomura | G06T 11/60 |
| | | | | 382/217 |
| 2011/0099199 | A1 | 4/2011 | Stalenhoef et al. | |
| 2011/0150340 | A1* | 6/2011 | Gotoh | G06K 9/00308 |
| | | | | 382/190 |
| 2013/0194438 | A1* | 8/2013 | Sweet, III | G06K 9/00221 |
| | | | | 348/207.1 |
| 2015/0063640 | A1* | 3/2015 | Anabuki | G06T 7/20 |
| | | | | 382/103 |
| 2016/0127642 | A1* | 5/2016 | Schechner | H04N 5/23206 |
| | | | | 348/38 |
| 2016/0224871 | A1 | 8/2016 | Koren et al. | |
| 2017/0098120 | A1* | 4/2017 | Bostick | G06T 11/206 |
| 2017/0238505 | A1* | 8/2017 | Gordon | A01K 29/00 |
| 2017/0253330 | A1* | 9/2017 | Saigh | B64C 39/024 |
| 2017/0337721 | A1 | 11/2017 | Kato et al. | |
| 2018/0114054 | A1* | 4/2018 | Dow | H04L 67/02 |
| 2018/0204093 | A1* | 7/2018 | Zhu | G06K 9/6218 |
| 2018/0285652 | A1* | 10/2018 | Dey | H04N 5/23219 |
| 2018/0349946 | A1* | 12/2018 | Nguyen | G06Q 30/0244 |
| 2019/0244154 | A1* | 8/2019 | Muta | G06Q 10/063114 |

OTHER PUBLICATIONS

Wyndham, "Lily: Astonishing new drone takes automated filming to unheard-of levels", http://www.redsharknews.com/production/item/2585-lilyastonishing-new-drone-takes-automated-filming-to-unheard-of-levels, May 15, 2015, 3 pages.

Bernstein, "Top 5 Best Auto Follow Drones", http://heavy.com/tech/2016/05/top-best-auto-follow-dronesautonomous-drone-phantom-4-ghostdrone-airdog/, May 19, 2016, 7 pages.

Anonymous, "Your Self-Flying Camera", https://hexoplus.com/, accessed Oct. 10, 2018, 10 pages.

Mell et al., "The NIST Definition of Cloud Computing", NIST, Special Publication 800-145, Sep. 2011, 7 pages.

\* cited by examiner

AUTOMATIC IDENTIFICATION OF RELATIONSHIPS BETWEEN A CENTER OF ATTENTION AND OTHER INDIVIDUALS/OBJECTS PRESENT IN AN IMAGE OR VIDEO

BACKGROUND

The present invention generally relates to automatic identification of relationships and, more particularly, to automatic identification of relationships between a center of attention and other individuals/objects present in an image or video.

User devices are often used to capture and share photos/videos of individuals and objects. Automated aerial vehicles are also used to capture footage for various purposes (e.g., security purposes, photography/videography of events, scenery, etc.).

SUMMARY

In an aspect of the invention, a computer-implemented method includes: accessing, by a computing device, content stored or captured by a user device; determining, by the computing device, context associated with the content; determining, by the computing device, a center of attention of the content based on the context; identifying, by the computing device, relationships between the center of attention and one or more other individuals or objects present in the content; and outputting, by the computing device, information identifying the relationships for displaying the information identifying the relationships on a content viewer application In an aspect of the invention, there is a computer program product including a computer readable storage medium having program instructions embodied therewith. The program instructions are executable by a computing device to cause the computing device to: access footage from a camera; determine a context associated with the footage; determine a center of attention of the content based on the context; identify relationships between the center of attention and one or more other individuals present in the footage; and output information identifying the relationships for displaying the information identifying the relationships on a content viewer application.

In an aspect of the invention, a system includes: a processor, a computer readable memory and a computer readable storage medium associated with a computing device; program instructions to access content stored or captured by a user device and selected, by a user via a user interface associated with a content viewer application, to be analyzed for relationship identification; program instructions to determine context associated with the content; program instructions to determine a center of attention of the content based on the context; program instructions to identify relationships between the center of attention and one or more other individuals or objects present in the content; and program instructions to output information identifying the relationships for displaying the information identifying the relationships on a content viewer application. The program instructions are stored on the computer readable storage medium for execution by the processor via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1:
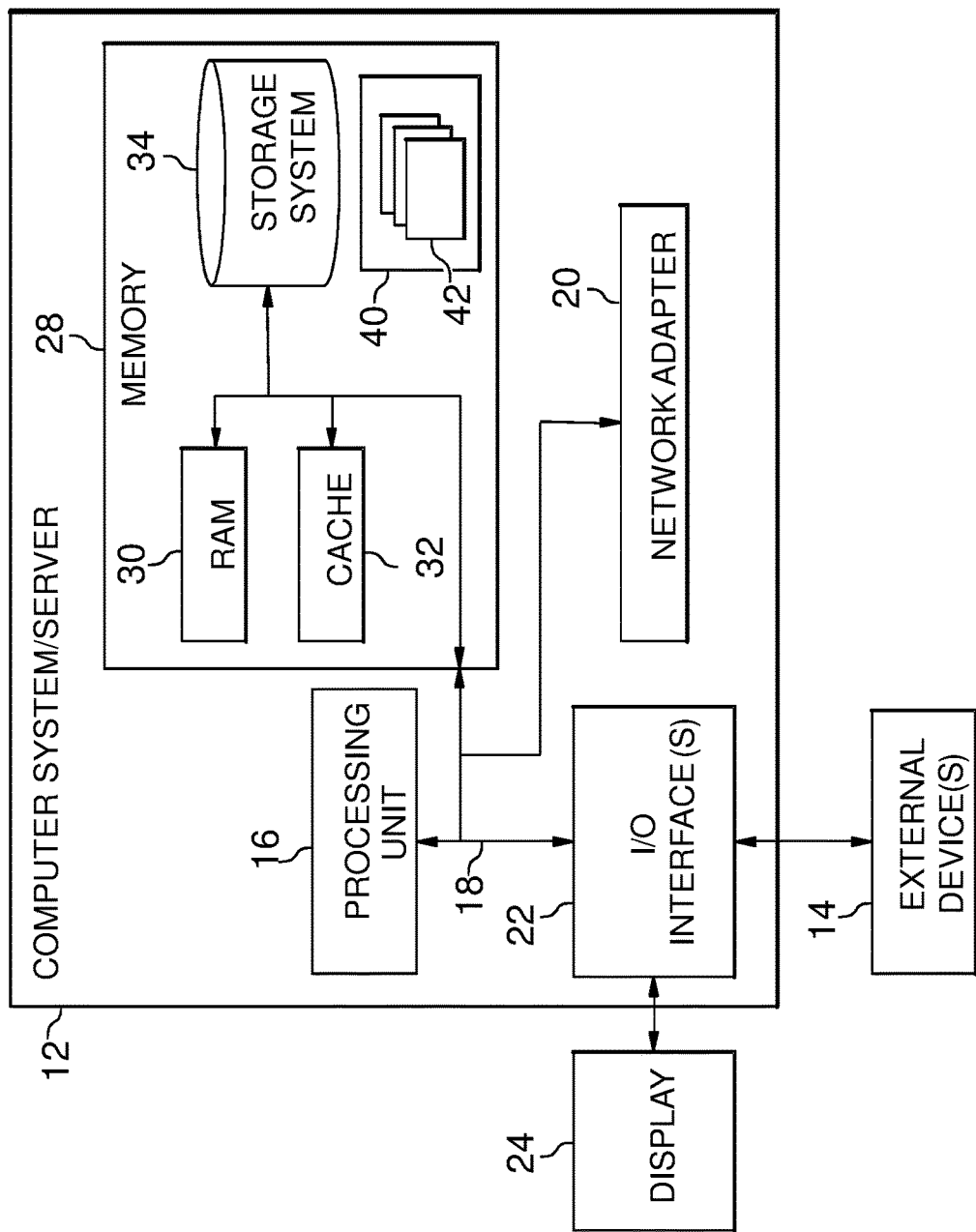
FIG. 1 depicts a cloud computing node according to an embodiment of the present invention.

The present invention generally relates to automatic identification of relationships and, more particularly, to automatic identification of relationships between a center of attention and other individuals/objects present in an image or video. More specifically, aspects of the present invention automatically identify the relationships between individuals pictured in a digital image or video (e.g., content) in relation to a center of attention based on contextual data associated with the content, social media data, user profile data, user activity data, etc.

In embodiments, aspects of the present invention include a content viewer application for presenting information identifying the relationships in a user interface of the content viewer application. For example, aspects of the present invention present the information identifying the relationships in the form of tags that are visually superimposed on the content. More specifically, aspects of the present invention automatically generate and present tags on individuals and/or objects within the content, in which the tags identify the center of attention (e.g., a particular individual or group of individuals) and the relationship of other individuals and/or objects to that individual. As an illustrative example, if the content includes an image of individuals present at a wedding, aspects of the present invention identify a center of attention (e.g., a bride and groom), and the relationship of other individuals to that center of attention (e.g., groom's mother, groom's father, bride's brother, etc.).

As another example, aspects of the present invention are used in security applications for analyzing content captured by security cameras, aerial cameras, etc. More specifically, aspects of the present invention identify the relationships between a center of attention (e.g., a point of interest, wildlife animal, autonomous device, etc.), and other individuals/objects/animals in which the center of attention interacts. For example, if a point of interest is being tracked across multiple cameras in a wide vicinity, it may be of interest to know who the point of interest interacts with and in turn to track those interactions.

In embodiments, the center of attention is different for different contexts, different situations, or for different users. Accordingly, when content is being viewed, aspects of the present invention identify a center of attention for a given situation at a given time, and determine the relationships of surrounding individuals/objects to that determined center of attention. In embodiments, the center of attention can be either user-defined, or automatically determined.

As described herein, metadata is embedded within a content file in which the metadata includes data shared among user devices within a vicinity of where the content was captured. For example, software installed in various user devices shares data (e.g., social media data, calendar data, location data, etc.) amongst each other to identify context of an event surrounding a captured image or video (e.g., a public speaking event, marriage ceremony, etc.). In embodiments, the center of attention within the content file (e.g., within the image or video) is identified base on a predefined rule, contextual analysis etc. In embodiments, one or more centers of attention can be identified. In embodiments, aspects of the present invention also gather biometric data, emotional data, personalized information, personalized interest etc. to identify the personalized center of attention (e.g., a singer to sing in a marriage party). That is, the center of attention changes based on changing situations and context. For example, at one point, the bride and groom of a wedding are the center of attention, but as the user's interest refocuses to a different context, the center of attention is modified accordingly. Once the center of attention is identified, aspects of the present invention gather social network data to determine how other different person/ objects are related to the center of attention. Further, aspects of the present invention display relationship within a content viewing application, which can be accessed via a user device, augmented reality glasses, and/or in a social networking environment.

In embodiments, aspects of the present invention include a cognitive component for an autonomous photography/ videography device (e.g., implemented an aerial vehicle) in which the cognitive component is used to make intelligent decisions as to images/videos to capture during an event. For example, the cognitive component determines a center of attention based on contextual data that is used to identify an event and event type, and determines appropriate individuals and times to capture images and videos (such as a photograph of a bride and groom during a vows exchange).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
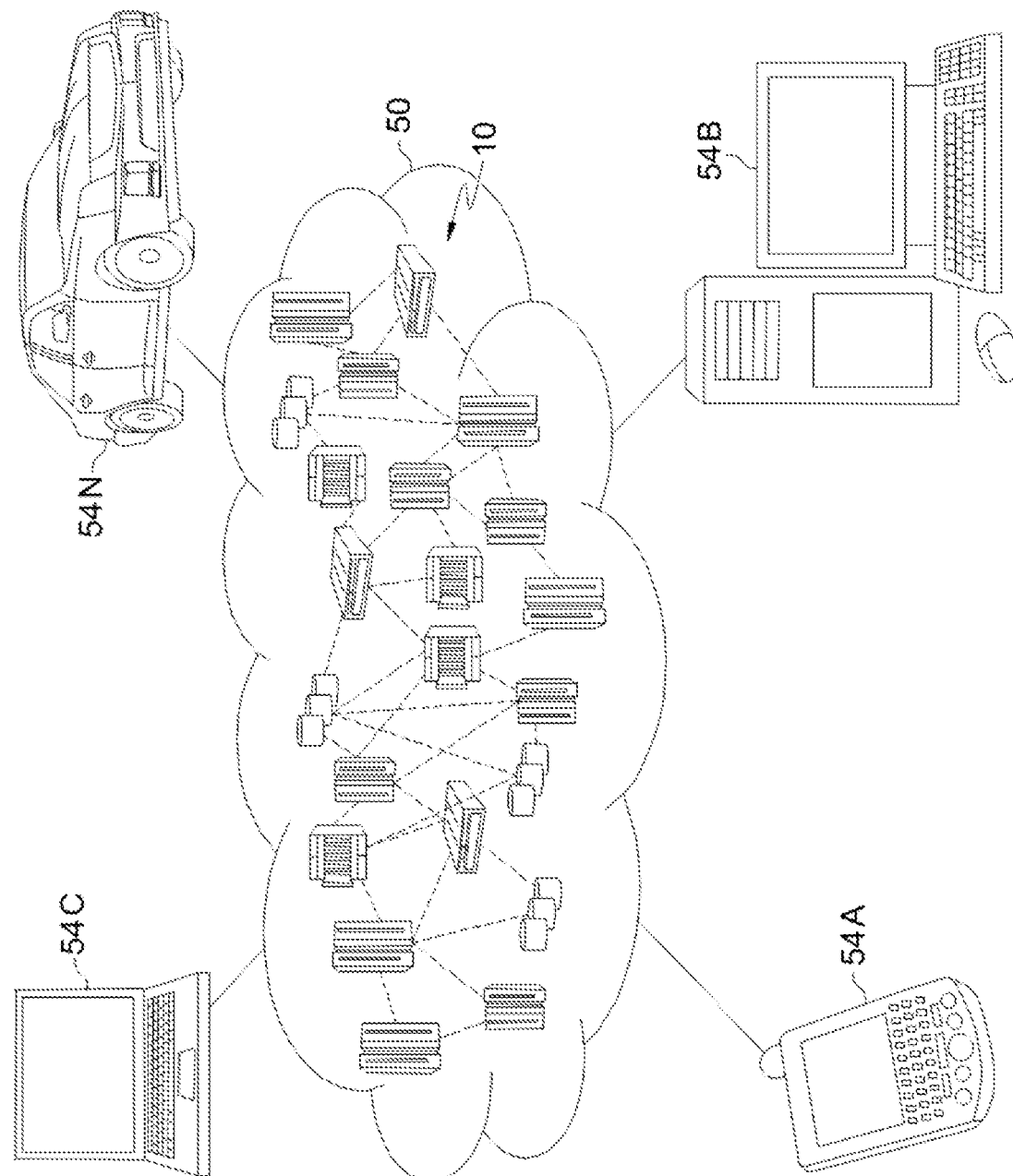
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
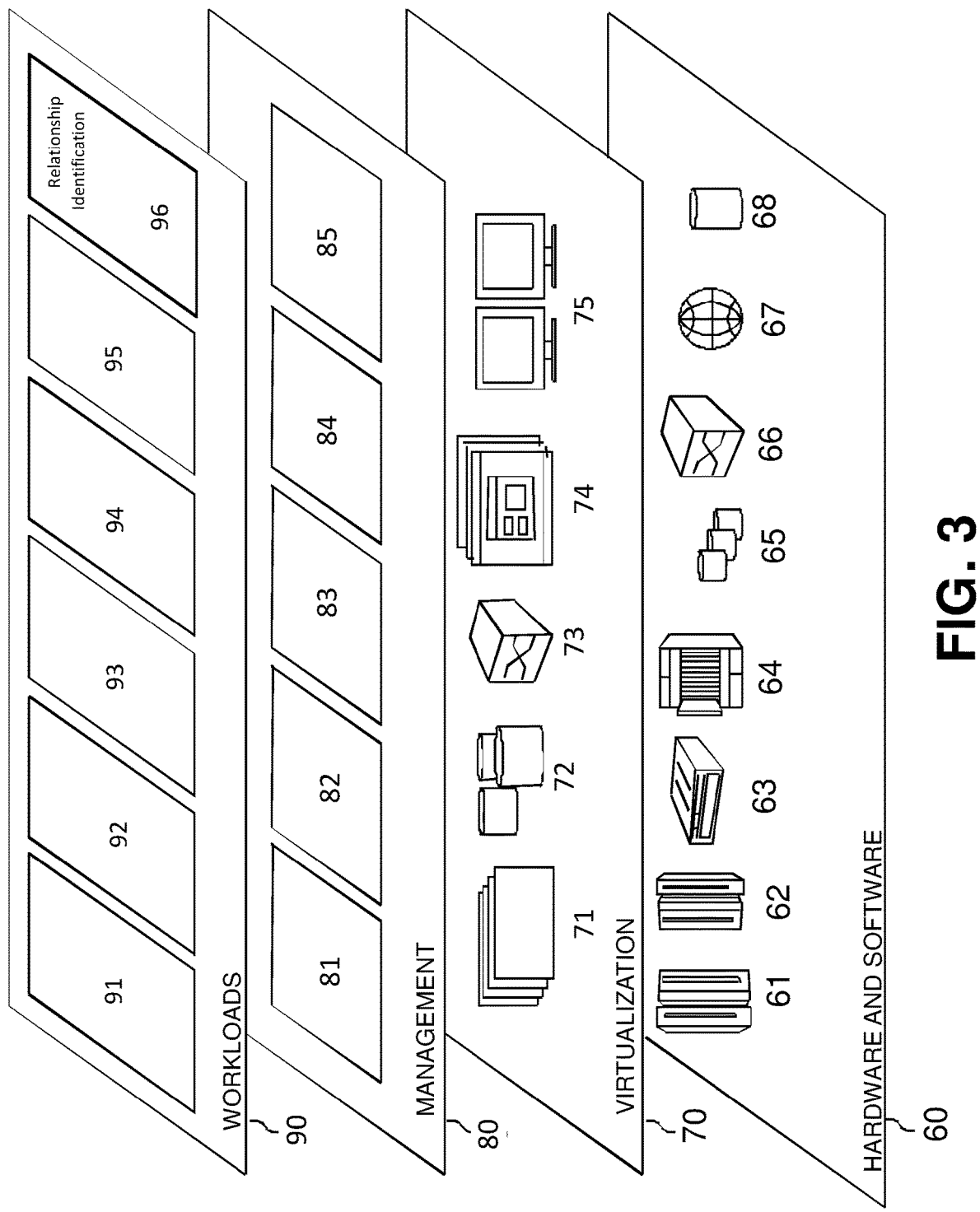
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and relationship identification 96.

Referring back to FIG. 1, the program/utility 40 may include one or more program modules 42 that generally carry out the functions and/or methodologies of embodiments of the invention as described herein (e.g., such as the functionality provided by relationship identification 96). Specifically, the program modules 42 may receive or access content, determine a context associated with the content, determine a center of attention of the content obtain data related to the center of attention, identify relationships between the center of attention and other individuals present in the content, and output information regarding the identified relationships for displaying the identified relationships. Other functionalities of the program modules 42 are described further herein such that the program modules 42 are not limited to the functions described above. Moreover, it is noted that some of the modules 42 can be implemented within the infrastructure shown in FIGS. 1-3. For example, the modules 42 may be representative of a parking selection server as shown in FIG. 4.

Figure 4:
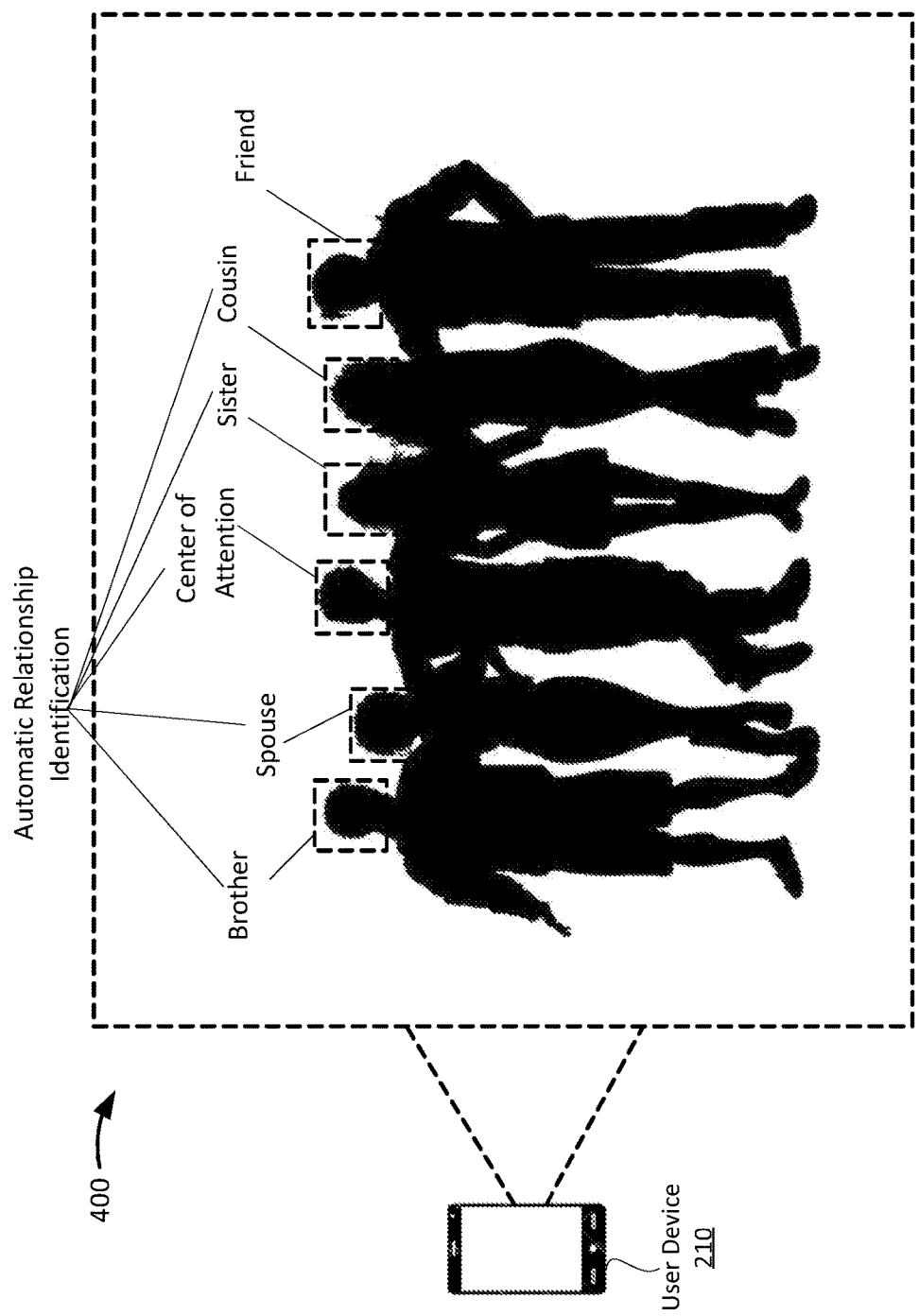
FIG. 4 shows an overview of an example implementation in accordance with aspects of the present invention.

FIG. 4 shows an overview of an example implementation in accordance with aspects of the present invention. As shown in FIG. 4, in accordance with aspects of the present invention, a user device 210 implements a content viewer with a user interface (e.g., user interface 400). In the illustrative example shown, the user interface 400 displays an image of individuals. In embodiments, the user interface 400 automatically displays tags that identify a center of attention and the relationships of individuals to the center of attention by incorporating the processes described herein. For example, the user device 210 incorporates a cognitive component, or communicates with a remote cognitive application server to identify the center of attention based on a contextual analysis of metadata embedded within the image, and based on social media data and/or other external data that identifies the relationships of individuals within the image.

Figure 5:
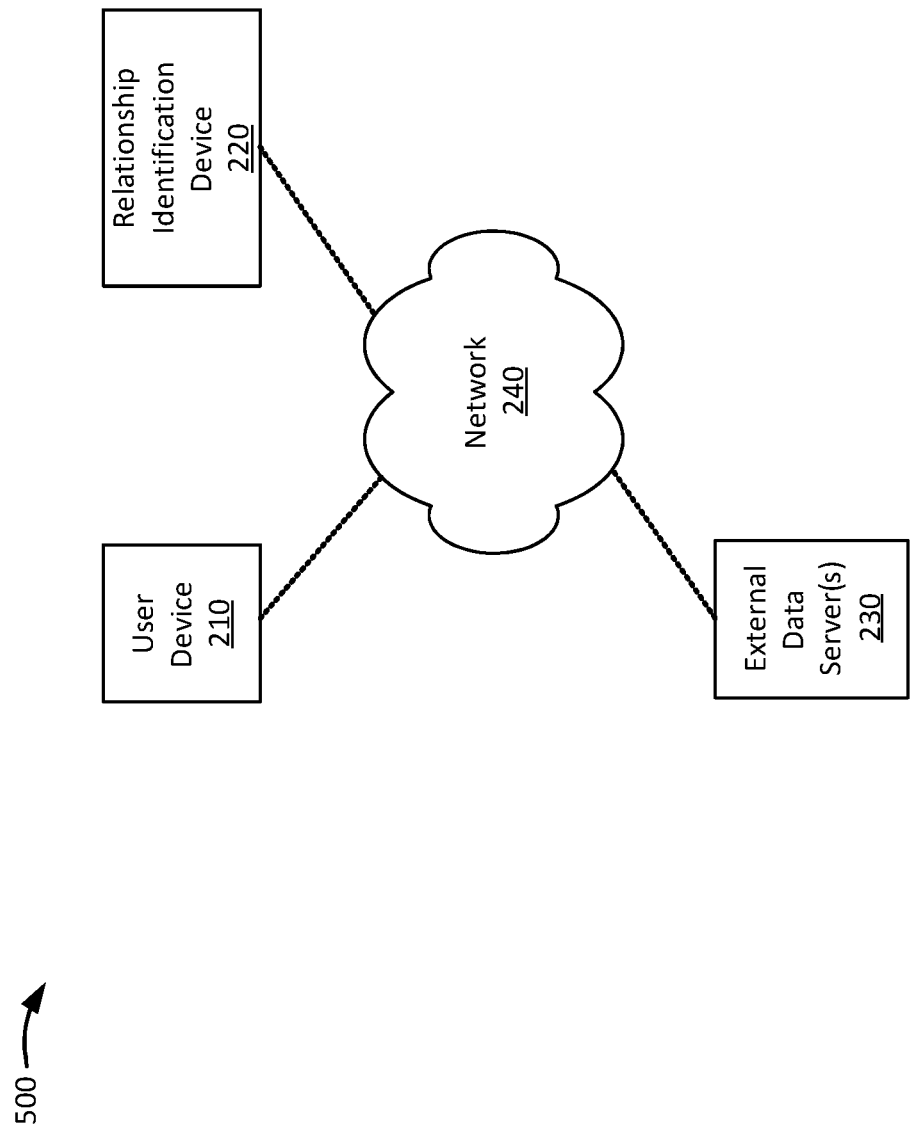
FIG. 5 shows an example environment in accordance with aspects of the present invention.

FIG. 5 shows an example environment in accordance with aspects of the present invention. As shown in FIG. 5, environment 500 includes a user device 210, a relationship identification device 220, one or more external data servers 230, and a network 240. In embodiments, one or more components in environment 500 may correspond to one or more components in the cloud computing environment of FIG. 2. In embodiments, one or more components in environment 500 may include the components of computer system/server 12 of FIG. 1.

The user device 210 includes a computing device capable of communicating via a network, such as the network 240. In example embodiments, the user device 210 corresponds to a mobile communication device (e.g., a smart phone or a personal digital assistant (PDA)), a portable computer device (e.g., a laptop or a tablet computer), a desktop computer, and/or another type of computing device. Additionally, or alternatively, the user device 210 includes a camera device. In embodiments, the user device 210 is used to capture content (e.g., images and/or videos) and includes a component that shares metadata among other user devices 210 (e.g., social media data, calendar data, location data, etc.). In embodiments, this metadata is embedded within a content file for identifying the context of an event associated with the content file. In embodiments, the user device 210 hosts a content viewing application with a user interface (e.g., similar to user interface 400 of FIG. 4) to view content and tags that identify a center of attention and the relationship of other individuals/object within the content that are related to the center of attention.

The relationship identification device 220 includes one or more computing devices (e.g., such as computer system/server 12 of FIG. 1) that implements the processes of aspects of the present invention. For example, the relationship identification device 220 receives or accesses content (e.g., from the user device 210), determines a context associated with the content, determines a center of attention of the content obtain data related to the center of attention, identifies relationships between the center of attention and other individuals present in the content, and outputs information regarding the identified relationships for displaying the identified relationships (e.g., within the user device 210 for display within a content viewer application).

The external data server 230 includes one or more computing devices (e.g., such as computer system/server 12 of FIG. 1) that hosts a social media platform, stores event information, user activity information, and/or other information used to identify an event associated with an image or video. Additionally, or alternatively, the external data server 230 stores information that is used to identify relationships between a center of attention and other individuals/objects in the image/video based on social media data, historical data regarding the center of attention and other individuals/objects, etc.

The network 240 may include network nodes, such as network nodes 10 of FIG. 2. Additionally, or alternatively, the network 240 may include one or more wired and/or wireless networks. For example, the network 240 may include a cellular network (e.g., a second generation (2G) network, a third generation (3G) network, a fourth generation (4G) network, a fifth generation (5G) network, a long-term evolution (LTE) network, a global system for mobile (GSM) network, a code division multiple access (CDMA) network, an evolution-data optimized (EVDO) network, or the like), a public land mobile network (PLMN), and/or another network. Additionally, or alternatively, the network 240 may include a local area network (LAN), a wide area network (WAN), a metropolitan network (MAN), the Public Switched Telephone Network (PSTN), an ad hoc network, a managed Internet Protocol (IP) network, a virtual private network (VPN), an intranet, the Internet, a fiber optic-based network, and/or a combination of these or other types of networks.

The quantity of devices and/or networks in the environment 500 is not limited to what is shown in FIG. 5. In practice, the environment 500 may include additional devices and/or networks; fewer devices and/or networks; different devices and/or networks; or differently arranged devices and/or networks than illustrated in FIG. 5. Also, in some implementations, one or more of the devices of the environment 500 may perform one or more functions described as being performed by another one or more of the devices of the environment 500. For example, in embodiments, operations of the relationship identification device 220 are performed locally by the user device 210. Alternatively, operations of the relationship identification device 220 are performed by a remote cloud-based server in which the relationship identification device 220 processes information in the manner described herein, and in turn, communicates information to the user device 210 for presenting and displaying tags of relationships to a center of attention. Devices of the environment 500 may interconnect via wired connections, wireless connections, or a combination of wired and wireless connections.

Figure 6:
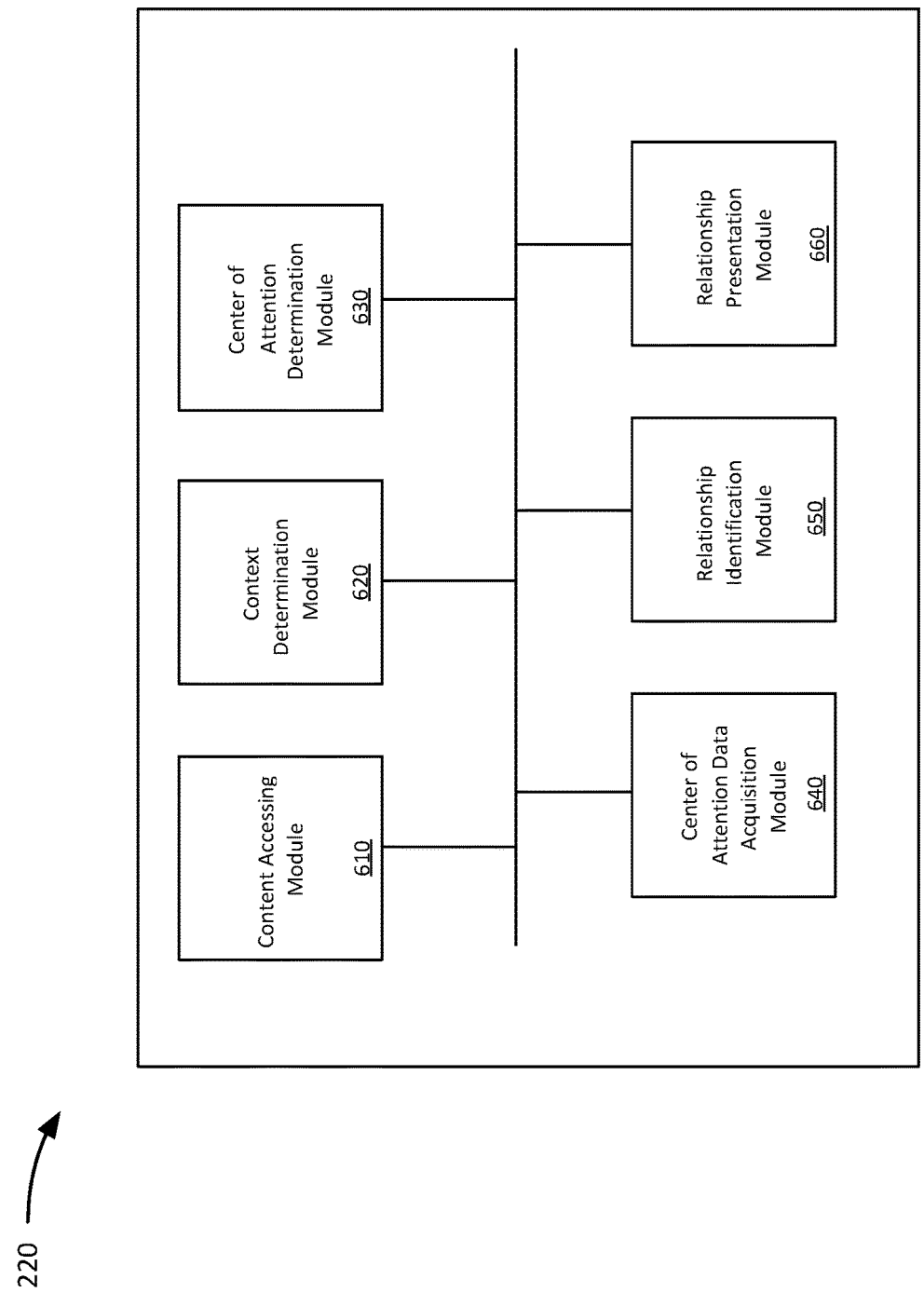
FIG. 6 shows a block diagram of example components of relationship identification device in accordance with aspects of the present invention.

FIG. 6 shows a block diagram of example components of a relationship identification device 220 in accordance with aspects of the present invention. As shown in FIG. 6, the relationship identification device 220 includes a content accessing module 610, a context determination module 620, a center of attention determination module 630, a center of attention data acquisition module 640, a relationship identification module 650, and a relationship presentation module 660. In embodiments, the relationship identification device 220 may include additional or fewer components than those shown in FIG. 6. In embodiments, separate components may be integrated into a single computing component or module. Additionally, or alternatively, a single component may be implemented as multiple computing components or modules.

In embodiments, the content accessing module 610 includes a program module (e.g., program module 42 of FIG. 1) that access content for which to identify a center of attention and associated relationships to the center of attention. In embodiments, the content accessing module 610 accesses content from the user device 210 (e.g., content that was captured and/or stored by the user device 210 and that a user selects to have analyzed for relationship identification). In embodiments, the content accessing module 610 accesses content that was previously captured and stored on user device 210, or accesses live content that is being captured in real time (e.g., in an embodiment in which aspects of the present invention are used to analyze security footage and relationships of individuals that interact with a center of attention, such as a point of interest).

In embodiments, the context determination module 620 includes a program module (e.g., program module 42 of FIG. 1) that determines a context associated with the content. More specifically, the context determination module 620 determines an event associated with the content and/or other activities that are occurring in the content. In embodiments, the context determination module 620 determines the context based on metadata stored/embedded within the content and based on predefined rules defining the context associated with a set of metadata. In embodiments, the metadata is gathered by the user device 210 that captured the content and also gathered and shared among other surrounding participating user devices 210 within a vicinity of the user device 210 with which the content was captured (e.g., social media data, calendar data, location data/geotags, biometrics data, emotional state data, etc.).

Additionally, or alternatively, the context determination module 620 determines the context based on pixel-based classification data that identifies objects, patterns, clothing, etc. that are present within the content. As an illustrative example, the presence of a wedding cake and an individual wearing a wedding dress indicates that the content is associated with a wedding event. As another example, the presence of individuals wearing black attire and in a distressed emotional state (as indicated by emotional state data shared by surrounding user devices 210) indicate that the content is associated with a funeral event. Additionally, or alternatively, the context determination module 620 determines the context by correlating the metadata with information from the external data servers 230. For example, in embodiments, the external data servers 230 identifies event-related information and/or other contextual information associated with the social media data, location data, and/or other metadata embedded within the content.

In embodiments, the center of attention determination module 630 includes a program module (e.g., program module 42 of FIG. 1) that determines a center of attention within the content. For example, the center of attention determination module 630 determines the center of attention based on the determined context (e.g., as determined by the context determination module 620) and further based on a set of pre-defined rules that define what the center of attention is based on the context and/or other metadata. As an illustrative example, the center of attention determination module 630 determines that the center of attention is a bride at a wedding based on the context of the content being that of a wedding. The center of attention determination module 630 identifies that the content includes a bride based on pixel-based classification techniques identifying an individual wearing bridal attire. In embodiments, the center of attention is dynamic for different images/videos based on the individuals present within the image or within the video at a given time. In embodiments, the center of attention can be user defined via a content viewer application. For example, one user can select one individual to be a center of attention whereas a different user can select a different individual to be the center of attention.

In embodiments, the center of attention data acquisition module 640 includes a program module (e.g., program module 42 of FIG. 1) that acquires data relating to the center of attention (e.g., as determined by the center of attention determination module 630). For example, the center of attention data acquisition module 640 obtains social media data, family history data, and/or other relationship-identification related data associated with the center of attention. In embodiments, the center of attention data acquisition module 640 obtains such data by searching social media platforms and/or family history databases for the center attention (e.g., by name, by image search, etc.).

In embodiments, the relationship identification module 650 includes a program module (e.g., program module 42 of FIG. 1) that identifies relationships between the center of attention and other individuals/objects within the content using the data regarding the center of attention (e.g., data acquired by the center of attention data acquisition module 640). In embodiments, the relationship identification module 650 determines a relationship of an individual and of the center of attention based on machine learning algorithms using, for example, social media data/family history data and/or facial recognition data as inputs. For example, the relationship identification module 650 determines the identity of the individual using facial recognition, accesses the individual's social media profile and/or family history data, and determines a relationship between the individual and the center of attention from the social media profile and/or family history data.

As an illustrative example, the relationship identification module 650 determines that an individual in the content is a cousin of the center of attention (e.g., bride and/or groom of a wedding). In embodiments, the relationship presentation module 660 determines the relationship of an object or animal to the center of attention based on the center of attention's social media profile and/or other information indicating the relationship. As an illustrative example, the relationship presentation module 660 determines that an animal is a pet of the center of attention based on past images from the center of attention's social media profile indicating that the animal is a pet. Additionally, or alternatively, the relationship presentation module 660 determines that an object is a sentimental object (e.g., a toy) based on passed images from the center of attention's social media profile indicating that the object is a toy. As described herein, the relationship identification device 220 identifies the relationships automatically without user involvement, thereby saving the user time from having to manually tag the individuals and objects within the content. However, user input may be received to confirm or correct the automatically identified relationships and/or manually identify the relationships if the relationships are unable to be automatically identified. In embodiments, the confirmation/corrections of the relationships and/or the manually inputted information of the relationships are fed back into the machine learning algorithms and used to improve future identification of relationships with the center of attention.

In embodiments, the relationship presentation module 660 includes a program module (e.g., program module 42 of FIG. 1) that presents the relationships (e.g., as identified by the relationship identification module 650). For example, the relationship presentation module 660 outputs information regarding the relationships to a content viewer application hosted by a user device 210. In embodiments, the user device 210 receives the relationship identification information and presents the relationship identification information in the form of tags that label the center of attention and the relationship of individuals and/or objects/animals to the center of attention.

Figure 7:
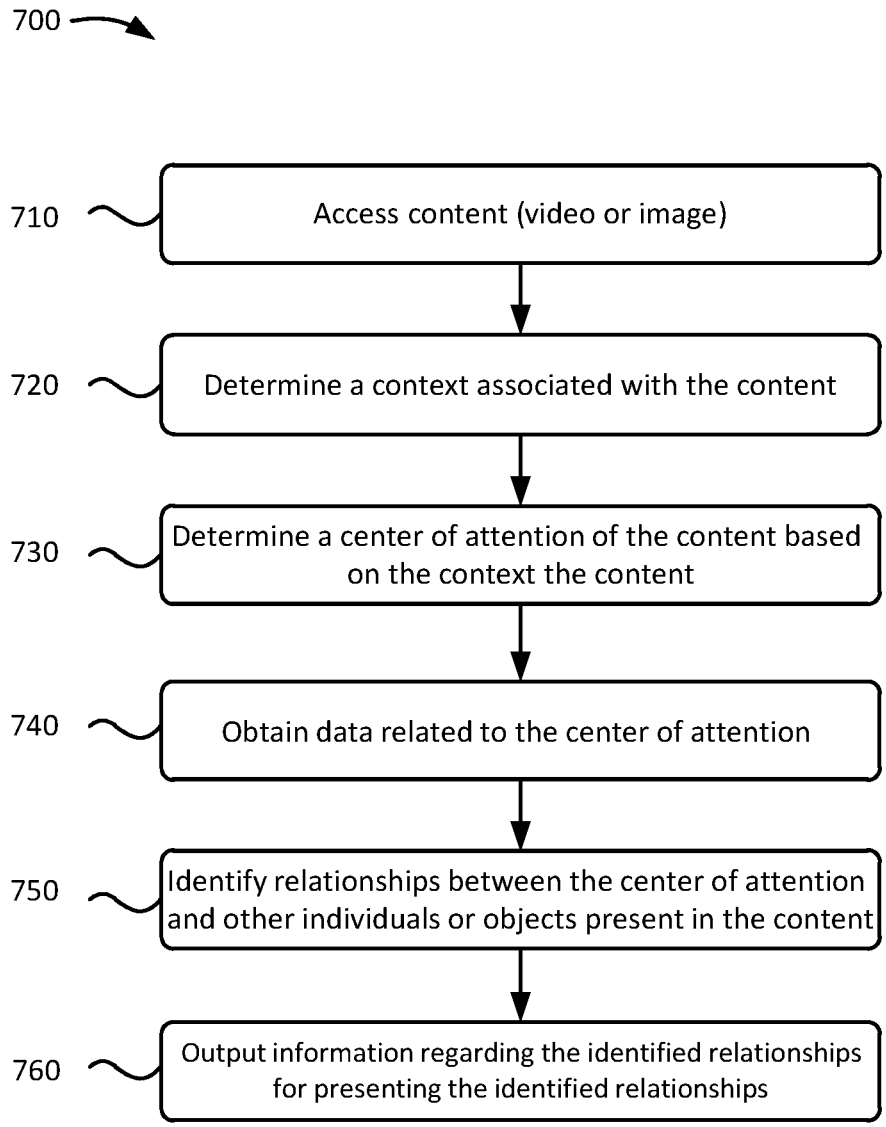
FIG. 7 shows an example flowchart of a process for identifying and presenting information identifying the relationship of individuals and objects to a center of attention in accordance with aspects of the present invention.

FIG. 7 shows an example flowchart of a process for identifying and presenting information identifying the relationship of individuals and objects to a center of attention. The steps of FIG. 7 may be implemented in the environment of FIG. 5, for example, and are described using reference numbers of elements depicted in FIG. 5. As noted above, the flowchart illustrates the architecture, functionality, and operation of possible implementations of systems, methods, and computer program products according to various embodiments of the present invention.

As shown in FIG. 7, process 700 includes accessing content, such as a video or image (step 710). For example, as described above with respect to the content accessing module 610, the relationship identification device 220 accesses content from the user device 210 (e.g., content that was captured and/or stored by the user device 210 and that a user selects, via a user interface of a content viewer application, to have analyzed for relationship identification).

Process 700 also includes determining a context associated with the content (step 720). For example, as described above with respect to the context determination module 620, the relationship identification device 220 determines an event associated with the content and/or other activities that are occurring in the content. In embodiments, the context determination module 620 determines the context based on metadata stored/embedded within the content and based on predefined rules defining the context associated with a set of metadata. Additionally, or alternatively, the context determination module 620 determines the context based on pixel-based classification data that identifies objects, patterns, clothing, etc. that are present within the content.

Process 700 further includes determining a center of attention of the content based on the context of the content (step 730). For example, as described above with respect to the center of attention determination module 630, relationship identification device 220 determines the center of attention based on the determined context (e.g., as determined at step 720) and further based on a set of pre-defined rules that define what the center of attention is based on the context and/or other metadata.

Process 700 also includes obtaining data related to the center of attention (step 740). For example, as described above with respect to the center of attention data acquisition module 640, the relationship identification device 220 acquires data relating to the center of attention (e.g., as determined at step 730). For example, the center of attention data acquisition module 640 obtains social media data, family history data, emotional state data, personal information, biometrics data, and/or other relationship-identification related data associated with the center of attention.

Process 700 further includes identifying relationships between the center of attention and other individuals or objects present in the content (step 750). For example, as described above with respect to the relationship identification module 650, the relationship identification device 220 identifies relationships between the center of attention and other individuals/objects within the content using the data regarding the center of attention (e.g., data acquired at step 740). In embodiments, the relationship identification device 220 determines a relationship of an individual and of the center of attention based on social media data/family history data and/or facial recognition. As described herein, the relationship identification device 220 identifies the relationships automatically without user involvement, thereby saving the user time from having to manually tag the individuals and objects within the content. However, user input may be received to confirm or correct the identified relationships and/or manually identify the relationships if the relationships are unable to be automatically identified.

Process 700 also includes outputting information regarding the identified relationships for presenting the identified relationships (step 760). For example, as described above with respect to the relationship presentation module 660, the relationship identification device 220 outputs information regarding the relationships to a content viewer application hosted by a user device 210. In embodiments, the user device 210 receives the relationship identification information and presents the relationship identification information in the form of tags that label the center of attention and the relationship of individuals and/or objects/animals to the center of attention. In embodiments, a user device 210 including augmented reality glasses and/or other types of wearable computing devices receive the relationship identification information and presents the relationship identification information in the form of tags.

In embodiments, aspects of the present invention are used to track relationships between a center of attention (e.g., a point of interest) from security footage and other individuals in which the center of attention has interacted. As the network of security cameras and footage is vast, aspects of the present invention provide a technique for pruning through content from what is essentially a gigantic and associative network of footage from cameras. The network can be composed of footage that is static in which the footage has already been taken and finding footage of interest involves going through historical data. This could be a case of real-time tracking and recording. Not all streaming footage can be maintained, and aspects of the present invention incorporate data retention policies at both a privacy and pragmatic level. Depending on framerate and compression, a single security camera can record up to 20 gigabytes (GB) of data per 24-hour period, which in some regions, would work out to a retention of 412 petabytes (PB) per 24-hour period, or 146 exabytes (EB) per year.

In embodiments, aspects of the present invention use source node labelling to identify the center of attention. In embodiments, weightings are also implemented for identifying the center of attention. For example, in the use case of a wedding, the bride and groom would have the highest weights which then expand out based on various relationships identified from social network data and/or other metadata. Using spreading activation techniques, these weights are then iteratively propagating or "spread" through other nodes. This activation may originate from alternate paths and will be identified by distinct markers, and terminate when two alternate paths reach the same node.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
accessing, by a computing device, content stored or captured by a user device;
determining, by the computing device, context associated with the content;
determining, by the computing device, a center of attention of the content based on the context;
identifying, by the computing device, relationships between the center of attention and one or more other individuals or objects present in the content;
obtaining data related to the center of attention, wherein the identifying the relationships is based on the obtained data; and
outputting, by the computing device, information identifying the relationships for displaying the information identifying the relationships on a content viewer application,
wherein the data related to the center of attention includes social media data, and
the determining the center of attention comprises the implementation of weightings of the center of attention and the one or more other individuals or objects.

2. The computer-implemented method of claim 1, wherein the user device is a wearable computing device.

3. The computer-implemented method of claim 1, wherein the user device displays the information identifying the relationships in the form of tags.

4. The computer-implemented method of claim 1, wherein the determining the context is based on metadata stored within the content or pixel-based classification information associated with the content.

5. The computer-implemented method of claim 1, wherein the determining the context comprises identifying an event associated with the content.

6. The computer-implemented method of claim 1, further comprising receiving user input confirming or correcting the relationships and updating future identification of relationships based on the user input.

7. The computer-implemented method of claim 1, wherein the accessing the content comprises accessing live content in real time.

8. The computer-implemented method of claim 1, wherein a service provider at least one of creates, maintains, deploys and supports the computing device.

9. The computer-implemented method of claim 1, wherein the accessing the content, the determining the context, the determining the center of attention, the identifying the relationships, and the outputting the information identifying the relationships are provided by a service provider on a subscription, advertising, and/or fee basis.

10. The computer-implemented method of claim 1, wherein the computing device includes software provided as a service in a cloud environment.

11. The computer-implemented method of claim 1, further comprising deploying a system, wherein the deploying the system comprises providing a computer infrastructure operable to perform the accessing the content, the determining the context, the determining the center of attention, the identifying the relationships, and the outputting the information identifying the relationships.

12. A computer program product comprising a computer readable storage medium having program instructions embodied therewith, the program instructions executable by a computing device to cause the computing device to:
    access footage from a camera;
    determine a context associated with the footage;
    determine a center of attention of the content based on the context, the center of attention being an autonomous device;
    identify relationships between the center of attention and one or more individuals present in the footage;
    obtaining data related to the center of attention, wherein the identifying the relationships is based on the obtaining the data; and
    output information identifying the relationships for displaying the information identifying the relationships on a content viewer application,
    wherein the data related to the center of attention includes social media data, and
    the determining the center of attention comprises the implementation of weightings of the center of attention and the one or more individuals.

13. The computer program product of claim 12, wherein the user device displays the information identifying the relationships in the form of tags.

14. The computer program product of claim 12, wherein the determining the context is based on metadata stored within the content or pixel-based classification information associated with the content.

15. The computer program product of claim 12, wherein the determining the context comprises identifying an event associated with the content.

16. The computer program product of claim 12, wherein the accessing the footage comprises accessing the footage live in real time.

17. A system comprising:
    a processor, a computer readable memory and a computer readable storage medium associated with a computing device;
    program instructions to access content stored or captured by a user device and selected, by a user via a user interface associated with a content viewer application, to be analyzed for relationship identification;
    program instructions to determine context associated with the content;
    program instructions to determine a center of attention of the content based on the context, the center of attention being a wildlife animal;
    program instructions to identify relationships between the center of attention and one or more individuals or objects present in the content;
    program instructions to obtain data related to the center of attention, wherein the identifying the relationships is based on the obtained data; and
    program instructions to output information identifying the relationships for displaying the information identifying the relationships on a content viewer application,
    wherein the program instructions are stored on the computer readable storage medium for execution by the processor via the computer readable memory,
    wherein the data related to the center of attention includes social media data, and
    the determining the center of attention comprises the implementation of weightings of the center of attention and the one or more individuals or objects.

18. The system of claim 1, further comprising program instructions to automatically determine that the wildlife animal is the center of attention;
    program instructions to track the wildlife animal across multiple security cameras;
    program instructions to track interactions between the one or more other individuals or objects and the wildlife animal;
    program instructions to identify the wildlife animal for a given situation at a given time; and
    program instructions to prune content of the multiple security cameras.

* * * * *